US011300749B2

(12) United States Patent
Hendrickson et al.

(10) Patent No.: US 11,300,749 B2
(45) Date of Patent: Apr. 12, 2022

(54) PREPARATION OF FIBER OPTIC CABLES FOR DUCT APPLICATIONS

(71) Applicant: OFS Fitel, LLC, Norcross, GA (US)

(72) Inventors: Daniel Hendrickson, Roswell, GA (US); Eric J Leichter, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/924,619

(22) Filed: Jul. 9, 2020

(65) Prior Publication Data
US 2021/0149142 A1 May 20, 2021

Related U.S. Application Data

(60) Provisional application No. 62/936,794, filed on Nov. 18, 2019.

(51) Int. Cl.
*G02B 6/44* (2006.01)
*G02B 6/245* (2006.01)
(Continued)

(52) U.S. Cl.
CPC .......... *G02B 6/4463* (2013.01); *G02B 6/245* (2013.01); *G02B 6/25* (2013.01); *G02B 6/255* (2013.01); *G02B 6/448* (2013.01)

(58) Field of Classification Search
CPC ........ G02B 6/4463; G02B 6/245; G02B 6/25; G02B 6/255; G02B 6/448
(Continued)

(56) References Cited

U.S. PATENT DOCUMENTS 4,609,181 A 9/1986 Fisher et al.
5,763,003 A * 6/1998 Bonicel ............... B29C 35/10
118/405
(Continued)

FOREIGN PATENT DOCUMENTS

WO 9706460 A1 2/1997
WO 2013061111 A1 5/2013
WO 2016078708 A1 5/2016

OTHER PUBLICATIONS

OFS Fitel, LLC, DuctSaver Rollable Ribbon (RR) Central Core Cable (Jan. 2019).
(Continued)

*Primary Examiner* — Jerry M Blevins
(74) *Attorney, Agent, or Firm* — Law Offices of Leo Zacker

(57) ABSTRACT

Before pulling a leading end of a fiber optic cable through a duct in order to splice the cable fibers to other fibers located at a far end of the duct, the outer jacket of the cable and elements surrounding the cable fibers are removed to expose the fibers. The exposed fibers are prepared by (a) removing coatings on the fibers, (b) cleaving the ends of the fibers, and (c) placing the cleaved fibers into one or more protective covers. A cable grip or sock is dimensioned and formed to envelop the leading end of the cable including the protective covers, up to and including the outer jacket. The grip together with the cable are pulled through the duct, and the grip and the protective covers are removed at the far end of the duct to expose the cleaved fibers for splicing to the other fibers at the far end.

14 Claims, 3 Drawing Sheets

(51) Int. Cl.
*G02B 6/25* (2006.01)
*G02B 6/255* (2006.01)

(58) Field of Classification Search
USPC .......................................................... 385/114
See application file for complete search history.

(56) References Cited

U.S. PATENT DOCUMENTS

| | | |
|---|---|---|
| 8,165,444 B2 | 4/2012 | Pierce et al. |
| 8,548,294 B2 | 10/2013 | Toge et al. |
| 10,295,775 B1 | 5/2019 | Zhu et al. |
| 10,379,306 B2 | 8/2019 | Bringuier et al. |
| 10,627,594 B2 | 4/2020 | Zhu et al. |
| 10,649,163 B2 | 5/2020 | Bookbinder et al. |
| 2011/0135268 A1 | 6/2011 | Rudenick |
| 2019/0004273 A1* | 1/2019 | Faulkner .............. G02B 6/4472 |
| 2020/0012062 A1* | 1/2020 | Kirkpatrick .......... G02B 6/4465 |
| 2020/0142144 A1* | 5/2020 | Blazer ................... G02B 6/448 |

OTHER PUBLICATIONS

OFS Fitel, LLC, Rollable Ribbon Cable Solutions Guide—Outside Plant (Mar. 2020).
OFS Fitel, LLC, Rollable Ribbon Cable Solutions Guide—Inside Plant and Indoor/Outdoor (Mar. 2020).
European Patent Office, Extended Search Report (dated Feb. 26, 2021).

* cited by examiner

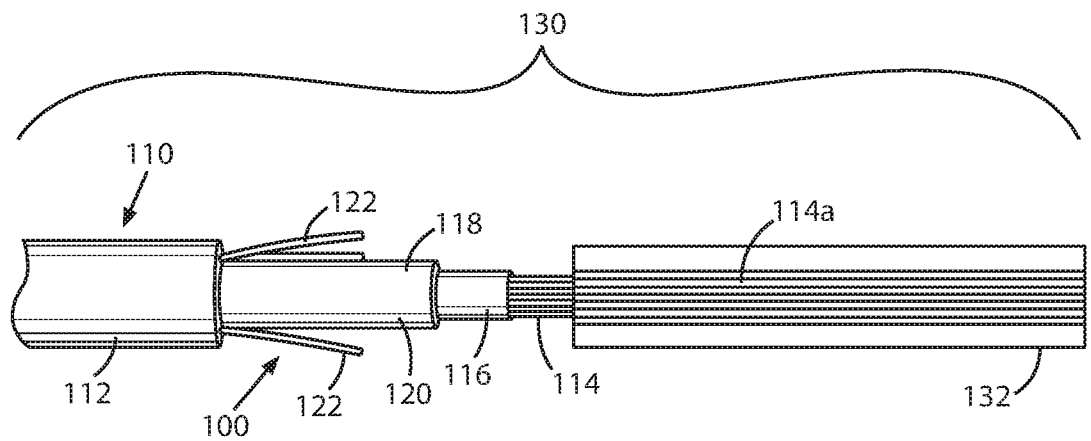
FIG. 3
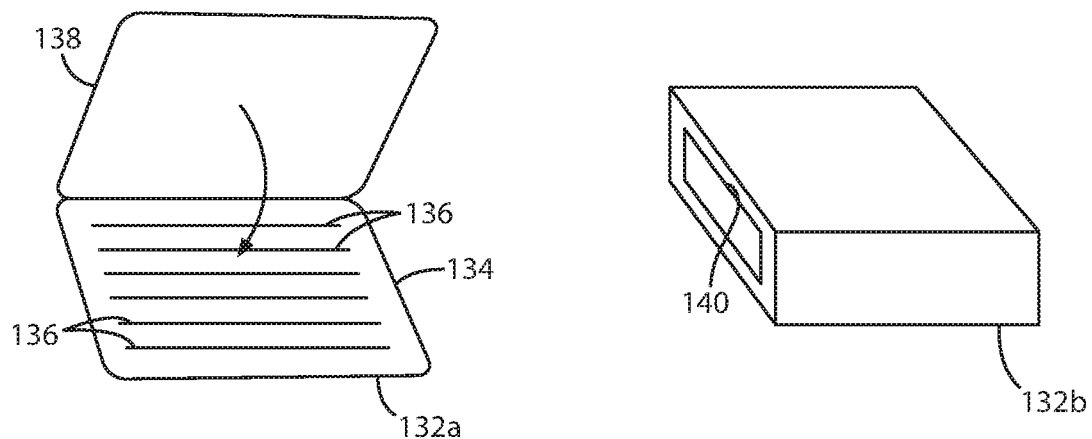
FIG. 4  FIG. 5

PREPARATION OF FIBER OPTIC CABLES FOR DUCT APPLICATIONS

CROSS REFERENCE TO RELATED APPLICATION

This application claims priority under 35 U.S.C. § 119(e) of U.S. Provisional Patent Application No. 62/936,794 filed Nov. 18, 2019, titled Cleave and Protect Solution for Duct Fiber Optic Cable Installation, the entire contents of which are incorporated by reference.

BACKGROUND OF THE INVENTION

Field of the Invention

The present invention relates generally to fiber optic cables, and particularly to such cables that may be routed through ducts.

Discussion of the Known Art

Fiber optic cables are often pulled through ducts to enter a building or other structure at a far end of the duct, in order to connect the cable fibers with other fibers at the far end. Cables used in duct applications typically have a high fiber count and a relatively small form factor so as to have enough flexibility for tight bending or coiling. For example, a fiber optic cable suited for duct applications is available from OFS Fitel, LLC, under the registered trademark Duct-Saver®. The cable is capable of connecting very large fiber distribution hubs, and of use in data centers, FTTx applications, and access networks.

FIG. 1 shows a cross-section or profile of the mentioned DuctSaver® fiber optic cable 10, and FIG. 2 is a side view of an end length of the cable 10 after a HDPE outer jacket 12 is stripped away to expose other elements of the cable 10. In the illustrated embodiment, optical fibers of the cable 10 are in the form of rollable ribbons 14 that are wrapped by a water blocking tape 16. The wrapped ribbons 14 are protectively surrounded by a crush resistant central core or tube 18. The cable 10 also has helically applied fiberglass strength members 20, and diametrically opposed ripcords 22 are embedded in the outer jacket 12.

An optical fiber ribbon may include, for example, from 2 to 12 fibers that are bonded alongside one another. The fibers of a rollable ribbon, in particular, are bonded periodically to one another in a way that allows the ribbon to fold and unfold easily about its long axis, a feature not possible without impairing the fibers when bonded continuously to one another as in traditional flat ribbons. Multiple rollable ribbons can therefore be folded and contained inside a cable of a given outside diameter, and the cable will have greater flexibility than that of a cable of the same diameter but which contains the same number of ribbons in flat form. Also, when removed from a cable and unfolded on a flat surface, the fibers of a rollable ribbon can be prepared the same way as the fibers of traditional flat ribbons. See generally, U.S. Pat. No. 8,548,294 (Oct. 1, 2013) and U.S. Pat. No. 10,649,163 (May 12, 2020); DuctSaver Rollable Ribbon (RR) Central Core Cable (OFS Fitel, LLC, January 2019); and Rollable Ribbon Cable Solutions Guide—Outside Plant (OFS Fitel, LLC, March 2020). All relevant portions of the foregoing references are incorporated by reference.

Before a cable is pulled through a duct, a grip or sock is usually fixed over a leading end of the cable. The grip is configured to protect the fibers and other elements at the leading end from being damaged while the cable is being pulled through the duct by a cord that is attached at one end to the grip. See, e.g., U.S. Pat. No. 4,609,181 (Sep. 2, 1986), U.S. Pat. No. 8,165,444 (Apr. 24, 2012), U.S. Pat. No. 10,295,775 (May 21, 2019), and U.S. Pat. No. 10,627,594 (Apr. 21, 2020), all relevant portions of which are incorporated by reference. After the leading end of the cable is pulled out of the far end of the duct, and in addition to removing the grip, an installer must strip away a length of the outer jacket, remove all cable elements other than the fibers, and then prepare the fibers for splicing to corresponding fibers of one or more other cables at the far end of the duct.

For example and referring to FIG. 2, after removing the cable jacket 10 and strength members 20 at the leading end of the cable 10, the installer must cut away a length of the central core 18 and remove the water blocking tape 16 in order to expose the fiber ribbons 14. Next, he or she must flatten each of the ribbons 14, strip away coatings on the fibers of each ribbon, and then cleave the ends of the fibers using a special tool to enable the fibers to be spliced to other fibers at the far end of the duct. Thus, the installation procedure at the far end of the duct is time consuming and there is an ongoing desire by customers to shorten it.

A known approach toward reducing the installation time involves terminating the fibers at the leading end of the cable in fiber optic connectors, before the cable is pulled through a duct. The approach is not optimal in many cases, however. For example, when connectors are bundled together at the leading end of a cable and are covered by a pulling grip or sock, the overall size of the bundled connectors is likely to preclude a smooth passage of the leading end over the full length of the duct. Moreover, it may be difficult if not impossible to fix a pulling grip or sock firmly and safely over the leading end of the cable up to and including the cable jacket, and the cost and/or need to interface the terminated cable fibers with the fibers of another, non-terminated cable at the far end of the duct could limit the usefulness of this approach for all applications.

SUMMARY OF THE INVENTION

According to the invention, a method of pulling a fiber optic cable through a duct so that fibers of the cable are in condition for splicing to other fibers at a far end of the duct, includes producing a fiber optic cable having an outer jacket and containing a number of fibers. Before pulling a leading end of the cable through a given duct, a determined length of the outer jacket at the leading end is removed, thereby exposing a number of cable elements that surround the fibers. The exposed cable elements are also removed to expose the fibers, and the exposed fibers are prepared by (a) removing coatings on the ends of the fibers, (b) cleaving each of the fiber ends, and (c) placing the cleaved ends of the fibers into one or more protective covers.

A pulling grip is fixed over the leading end of the cable including the protective covers, up to and including the outer jacket of the cable. The grip together with the cable are pulled through the duct to exit at the far end of the duct whereat the grip and the protective covers are removed, thereby exposing the cleaved ends of the cable fibers for splicing to the other fibers at the far end of the duct.

According to another aspect of the invention, a fiber optic cable arrangement includes a fiber optic cable having an outer jacket, a number of fibers, and a number of cable elements surrounding the fibers. A leading end of the cable is configured so that a determined length of the outer jacket and the cable elements are removed, and end lengths of the fibers are exposed. The exposed end lengths of the fibers are prepared so that (a) coatings on the end lengths are removed, (b) the end lengths are cleaved, and (c) the cleaved end lengths are disposed inside one or more protective covers. A pulling grip or sock is arranged to be fixed over the leading end of the cable including the protective covers up to and including the outer jacket, and the grip together with the leading end of the cable are configured for pulling through a given duct. The cleaved end lengths of the fibers are then in condition for splicing to other fibers at a far end of the duct when the grip and the protective covers are removed at the far end.

For a better understanding of the invention, reference is made to the following description taken in conjunction with the accompanying drawing and the appended claims.

BRIEF DESCRIPTION OF THE DRAWING FIGURES

In the drawing:

FIG. 3 is a partly enlarged view of the cable as in FIG. 2, showing a fiber ribbon of the cable with a protective cover placed over an end of the ribbon according to the invention;

FIG. 4 is an isometric view of a first embodiment of a protective cover according to the invention;

FIG. 5 is an isometric view of a second embodiment of a protective cover according to the invention;

DETAILED DESCRIPTION OF THE INVENTION

Figure 1:
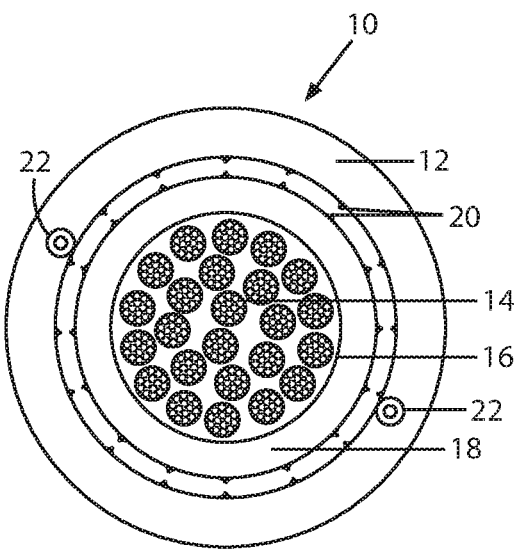
FIG. 1 is a cross-sectional profile of a known fiber optic cable.

The present invention reduces installation time in the field by preparing the fibers at a leading end of a fiber optic cable for splicing to other fibers at a far end of a duct, before the cable is pulled through the duct. The time required by an installer at the far end of the duct to splice the fibers at the leading end of the cable to the other fibers is therefore substantially reduced.

The invention can be used advantageously with fiber optic cables like the earlier mentioned DuctSaver and others that contain optical fiber ribbons capable of being fusion spliced to other fibers, when the ribbons are laid flat and the fibers are separated from one another. See U.S. Pat. No. 8,548,294 (Oct. 1, 2013); U.S. Pat. No. 10,379,306 (Aug. 13, 2019); and U.S. Pat. No. 10,649,163 (May 12, 2020), all of which are incorporated by reference.

According to the invention, prior to pulling a fiber optic cable such as, e.g., the cable 10 through a duct, the cable jacket 12, central core or tube 18, strength elements 20, and any water-blocking material 16 or armor in a leading end of the cable are removed. The fibers of the ribbons 14 are exposed over a determined length so as to fit, for example, into fusion splice trays arranged at the far end of a duct through which the leading end of the cable is pulled. Coatings on the fibers are removed, and the fibers are precision cut using, e.g., a conventional optical fiber cleaver tool. As a result, an installer at the far end of the duct no longer needs to spend time preparing the leading end of the cable further by removing the cable jacket and other elements that surround the cable fibers, exposing the fibers, and cleaving the fibers before splicing them to other fibers at the far end of the duct.

Figure 2:
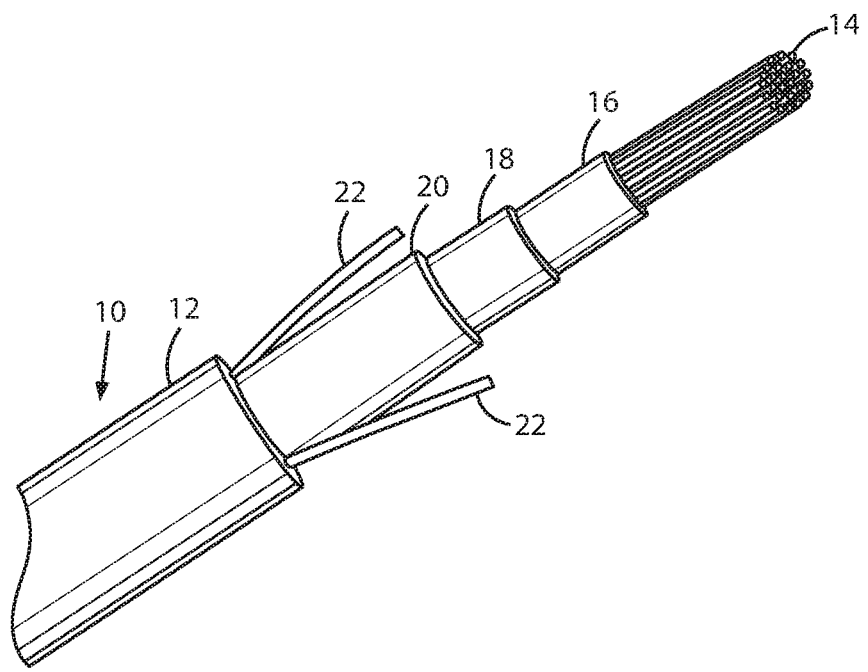
FIG. 2 is a side view of a leading end of the cable in FIG. 1.

FIG. 3 illustrates a fiber optic cable arrangement 100 according to the invention. The cable arrangement 100 includes a fiber optic cable 110 which, like the cable 10 in FIGS. 1 and 2, has an outer jacket 112, and optical fibers in the form of ribbons 114 about which a water blocking tape 116 is wrapped. The wrapped ribbons 114 are protectively surrounded by a crush resistant central core or tube 118. In the illustrated embodiment, the cable 110 also has helically applied fiberglass strength members 120, and diametrically opposed ripcords 122 embedded in the outer jacket 12.

A leading end 130 of the cable 110 is configured so that determined lengths of the outer jacket 112, the strength members 120, the central core 118, and the water blocking tape 116 are removed, thereby exposing end lengths of the optical fiber ribbons 114. One of the exposed ribbons, ribbon 114a, is shown enlarged and in flat or unfolded form in the right half of FIG. 3.

Optical fibers of the exposed ribbon 114a are prepared so that (a) previously applied coatings on the end lengths of the fibers are removed, (b) the end lengths of the fibers are cleaved, and (c) the cleaved end lengths of the fibers are placed inside one or more protective covers 132. The covers 132 are formed and dimensioned to prevent the cleaved fibers from getting dirty or damaged, and to keep the covered fibers isolated inside a pulling grip or sock to be applied afterward (see FIG. 7).

FIG. 4 shows one embodiment of a protective cover 132a for the cleaved fibers. The cover 132a has a base 134 with, for example, a number of parallel grooves 136 each of which is sized to seat a corresponding one of the fibers of ribbon 114a. The cover 132a also has a lid 138 constructed and arranged to snap closed over the base 134. Cover 132a can made from, e.g., a plastics or polymeric material. A second embodiment of a protective cover 132b for the cleaved fibers is shown in FIG. 5. The cover 132b has an open passage 140 that is dimensioned and formed to receive the cleaved fibers of the ribbon 114a, and to hold the fibers tightly in place until withdrawn later by an installer. Overall dimensions of the covers 132a or 132b should be sufficient to protect the cleaved fibers when closed, for example, approximately 0.5 in. wide by 0.2 in. high. Alternatively, and instead of using one of the rigid covers 132a or 132b in FIGS. 4 and 5, the area of the cleaved fibers may be covered and protected by applying a tape, foam, or gel to the area.

Figure 6:
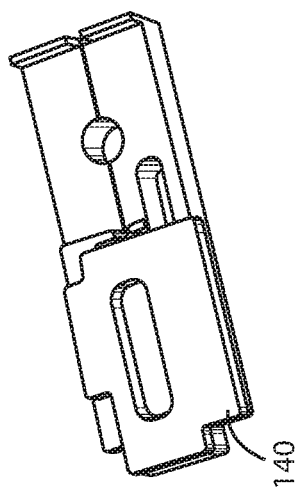
FIG. 6 shows an optical fiber holder that can serve as a protective cover according to the invention.

As a further alternative, and instead of using either of the rigid covers 132a or 132b, or applying a tape, foam, or gel to the area of the cleaved fibers before pulling the cable 110 through a duct, the ends of the fibers of each ribbon 114 may be protected by inserting the fibers into a holder 140 such as, e.g., a 250 micron coating fiber holder such as shown in FIG. 6 and available from OFS Fitel, LLC, part no. S710S-250. In such an arrangement, end lengths of un-prepared fibers are placed firmly into corresponding holders 140 before the cable 110 is covered by a grip and pulled through a duct. The fibers could then be easily prepared for splicing by an installer at the far end of a duct, including (1) coating removal, (2) fiber cleaving, and (3) fusion splicing the fibers to other fibers at the far end.

Figure 7:
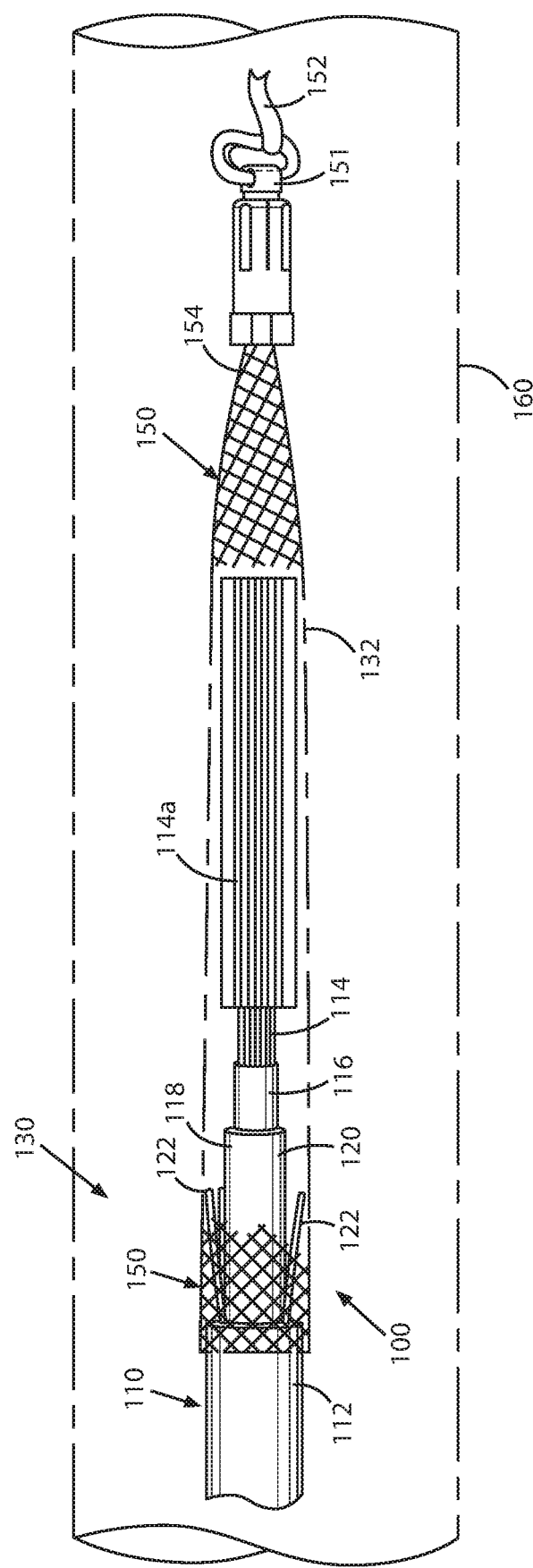
FIG. 7 is a side view of the leading end of the cable as in FIG. 3, depicting a mesh pulling grip or sock arranged over the leading end.

FIG. 7 is a side view of the leading end 130 of the cable 110 as in FIG. 3, depicting a mesh pulling grip or sock 150 placed over the leading end. The sock 150 is dimensioned and formed to envelop the leading end 130 of the cable including the protective covers 132, up to and including the cable outer jacket 112 to which the sock 150 is fixed by tape or otherwise.

A distal end 154 of the sock 150 is capped with an eyelet 151. The sock 150 together with the leading end 130 of the cable 110 can then be pulled through a duct 160 by way of a cord 152 attached to the eyelet 151 at the distal end 154 of the sock. The pulling force applied by the cord 152 is distributed over the sock 150 and down to the cable 110 so that the force does not act directly on the cable fibers 114. When the grip 150 is pulled to exit at the far end on the duct 160 and the protective covers 132 are removed, the exposed fibers of the cable will be ready for splicing to other fibers at the far end.

Splicing of the cable fibers 114 to the other fibers at the far end of the duct 160 may be achieved by traditional fusion methods using plasma arc, or by alternative methods such as, e.g., placing the fibers into trays and fusing them by a liquid chemical bonding process wherein the trays house clad alignment devices to aid in the bonding process, or by mechanical splicing using aligned v-grooves in separate splice trays. A mechanical splice mechanism may also be provided within the mesh sock 150 before the leading end 130 of the cable 110 is pulled through the duct 160.

The exposed fibers may, for example, be fusion spliced to unprepared or factory prepared fibers of a second cable whose fibers are disposed within a frame management system, similar to a known Multi-Access Modular Unit (MAMU) system at the far end of the duct 160. The system may comprise pre-terminated or connectorized optical fanouts wherein the connector ends are mounted into an optical distribution frame, and the second cable end is a bare ribbon. In this scenario, the second cable end may also be factory-prepared and ready for placement into a fusion splice machine.

While the foregoing represents preferred embodiments of the present invention, it will be understood by persons skilled in the art that various changes, modifications, and additions such as those suggested herein can be made without departing from the spirit and scope of the invention. For example, the invention is also applicable to standard flat ribbon cables, and to non-ribbon cables containing individual, non-bonded fibers. Accordingly, the invention includes all such changes, modifications, and additions as are within the bounds of the following claims.

We claim:

1. A method of pulling a fiber optic cable through a duct from a near end of the duct to a far end of the duct, so that optical fibers of the cable are ready for splicing to other optical fibers at the far end of the duct, comprising:

providing an unterminated fiber optic cable having an outer jacket and containing a number of coated optical fibers;

prior to pulling a leading end of the cable through the duct, removing a determined length of the outer jacket at the leading end of the cable, thereby exposing a number of cable elements that surround the fibers;

removing the exposed cable elements to expose ends of the fibers, and preparing the exposed fibers by (a) removing the coatings on the ends of the fibers, (b) cleaving each of the ends of the fibers, and (c) placing the cleaved ends of the fibers into one or more protective covers;

forming the protective covers so as to prevent the cleaved ends of the fibers from becoming dirty or damaged prior to a subsequent splicing step at the far end of the duct, and to keep the covered fibers isolated inside a pulling grip or sock to be fixed over the leading end of the cable;

fixing the pulling grip or sock over the leading end of the cable including the protective covers in which the cleaved ends of the fibers are placed, up to and including the outer jacket of the cable;

pulling the grip together with the leading end of the cable through the duct to exit at the far end of the duct;

removing, at the far end of the duct, the grip and the protective covers from the leading end of the cable, thereby exposing the cleaved ends of the cable fibers; and splicing, at the far end of the duct, the cleaved ends of the cable fibers to other optical fibers located at the far end of the duct.

2. The method of claim 1, including forming the protective covers from plastics sleeves, tubing, a gel, or foam.

3. The method of claim 1, including providing the protective covers in the form of optical fiber holders.

4. The method of claim 1, including arranging the other optical fibers at the far end of the duct in cabinet/shelf apparatus located at the far end of the duct.

5. The method of claim 1, including fusion splicing the exposed cleaved ends of the cable fibers to the other fibers at the far end of the duct.

6. The method of claim 1, wherein the fiber optic cable is provided with one or more optical fiber ribbons.

7. The method of claim 6, wherein the optical fiber ribbons are rollable ribbons.

8. A fiber optic cable arrangement for enabling the cable to be pulled through a duct so that optical fibers of the cable are ready for splicing to other fibers at a far end of the duct, comprising:

an unterminated fiber optic cable having an outer jacket, a number of coated optical fibers, and a number of cable elements that surround the fibers;

a leading end of the cable is configured so that a determined length of the outer jacket and the cable elements are removed, and end lengths of the coated optical fibers are exposed;

the exposed end lengths of the fibers are prepared so that (a) the coatings on the end lengths of the fibers are removed, (b) the end lengths are cleaved, and (c) the cleaved end lengths are disposed inside one or more protective covers;

the protective covers are constructed and arranged to prevent the cleaved ends of the fibers from becoming dirty or damaged prior to splicing the cleaved ends at a far end of the duct, and to keep the covered fibers isolated inside a pulling grip or sock to be fixed over the leading end of the cable; and the pulling grip or sock is constructed and arranged to envelop the leading end of the cable including the protective covers, and to be fixed to an end portion of the outer jacket of the cable;

wherein the grip and the leading end of the cable are configured for pulling through a given duct to exit at a far end of the duct, and the cleaved end lengths of the fibers are in condition for splicing to other optical fibers at the far end of the duct after the leading end of the cable is pulled through the duct and the grip and the protective covers are removed at the far end of the duct.

9. A fiber optic cable arrangement according to claim 8, wherein the protective covers in which the cleaved end lengths of the fibers are disposed, comprise plastics sleeves, tubing, foam, or a gel.

10. A fiber optic cable arrangement according to claim 8, wherein the protective covers in which the cleaved end lengths of the fibers are disposed, comprise optical fiber holders.

11. A fiber optic cable arrangement according to claim 8, wherein the pulling grip comprises a mesh sock a proximal end of which is fixed to the outer jacket of the cable.

12. A fiber optic cable arrangement according to claim 11, wherein a distal end of the mesh sock is formed into an eyelet for engaging a cord to pull the grip including the fiber optic cable through the duct.

13. A fiber optic cable arrangement according to claim 8, wherein the fiber optic cable contains one or more optical fiber ribbons.

14. A fiber optic cable arrangement according to claim 13, wherein the optical fiber ribbons are rollable ribbons.

\* \* \* \* \*